COLOR TELEVISION DISPLAY SYSTEMS

Filed May 29, 1950

3 Sheets-Sheet 1

INVENTOR
George C. Sziklai
BY
ATTORNEY

Feb. 21, 1961 G. C. SZIKLAI 2,972,659

COLOR TELEVISION DISPLAY SYSTEMS

Filed May 29, 1950 3 Sheets-Sheet 2

INVENTOR
George C. Sziklai
BY
[signature]
ATTORNEY

INVENTOR
George C. Sziklai
BY
ATTORNEY 2,972,659
Patented Feb. 21, 1961

2,972,659

COLOR TELEVISION DISPLAY SYSTEMS

George C. Sziklai, Princeton, N.J., assignor to Radio Corporation of America, a corporation of Delaware Filed May 29, 1950, Ser. No. 165,031
19 Claims. (Cl. 178—5.4)

The present invention relates to visual indicating systems and methods and more particularly although not necessarily exclsively to improved apparatus and methods for use in color television systems.

More directly, the present invention relates to an improved method and apparatus for processing and visually displaying color television signals in such a way as to overcome some of the complexities and disadvantages of prior art arrangements.

Some of the more promising present day systems of color television transmission are based on what is commonly known as a time division signal multiplexing. That is to say, the transmitted color television signal represents successive sampling intervals during which intervals the television transmitter samples the output of one of two or more, color television cameras. Each color camera develops at its output a signal representing the particular color version of the scene being transmitted to which it is responsive.

Broadly speaking, the time division multiplexing process in some form is carried out in all color television systems of the field sequential, line sequential and dot multiplex varieties.

In the dot multiplex color transmission system, with which the present invention is most directly but not necessarily exclusively concerned, the transmitted signal comprises a synchronizing component and a color information component. Due to frequency band width limitations of available radio communication channels the individual sampling periods of the dot multiplex signal, do not remain well defined but merge into a substantial sinusoidal wave. This sine wave is, of course, of the multiplex sampling frequency and by changing its phase relative to a given datum it is definitive of the various colors to be reproduced at the receiver. The datum with respect to which the phase of the transmitted sine wave varies, may be communicated to the receiver in a variety of forms. One present-day system, which is quote satisfactory, transmits a burst of the sampling frequency during the back porch of the standard television horizontal synchronizing pedestal. At the receiving terminal some form of phase detector is used to extract color information from the received signal. To do this, the phase detector compares the phase of the received color component with the datum signal.

As is well-known by those familiar with the dot multiplex color television art, the brightness of a particular color is defined by the amplitudes of the transmitted sine wave. Naturally, throughout a given transmission in which both brightness and color changes are rapidly occurring, the transmitted signal will not actually resemble a sine wave since its amplitude and phase are being continuously altered in accordance with the color picture detail.

Many arrangements have been suggested for processing and reproducing the color television receiver at the receiving end. Most all of such systems have incorporated the prior art technique of resampling or time-distributing the received color signal to a number of color channels corresponding in number and type to those employed at the transmitter. Resampled or distributed signal information in the receiver is then caused to produce representative color images which are by some means effectively superimposed or registered to reconstruct the original color scene. The circuitry of the signal processing circuits and methods of visually reproducing the full cmolor image are manifold. Examples of such systems are shown and described in an article entitled "New Directions in Color Television" appearing in the December 1949 issue of Electronics, page 66. Another pertinent article entitled "Dot Systems of Color Television" by Wilson Boothroyd also appears in two parts in the December 1949 and January 1950 issue of the same magazine.

In all of such systems, however, the cyclic interruptions of the teleision signal resulting from the transmitter multiplex of the three color channels as well as the cyclic distribution at the receiver causes rather noticeable effects to appear throughout the reproduced color image. Moreover, if a single color reproducing tube of the type using a multi-color phosphor screen with a perforated mask interposed between an electron beam gun and target is used to reproduce the image, futrher difficulties are encountered. A color tube of the latter type is described in detail in a recent pamphlet dated April 1950, by the Radio Corporation of America, RCA Laboratories Division, issued to the Federal Communications Commission, Washington, D.C. The title of the phamphlet is "General Description of Receivers for the RCA Color Television System Which Employ the RCA Direct-View Tri-Color Kinescopes." The particular tri-color kinescope of interest in connection with the present invention also is disclosed in a paper titled "A One-Gun Shadow-Mask Color Kinescope" by R. R. Law, published in the Proceedings of the I.R.E., vol. 39, No. 10, October 1951, at page 1194. Such a kinescope also forms the subject matter of a copending U.S. patent application of R. R. Law, Serial Uo. 165,552, filed June 1, 1950, entitled "Color Television." In the single gun arrangement described in this RCA publication and in the I.R.E. paper, the actual sampling is carried on at the image reproducing tube. This is accomplished by turning the electron beam on and off at predetermined intervals during which it is caused to produce one of three distinct primary colors on the target of the single color tube. However, in all of such systems, which employ a mask adjacent the target of the tube, a disturbance known as the "moiree" effect takes place which causes undesirable fringing and distortion in the television picture. This effect is attributable to the non-linear beating action of the sampling rate of the multiplex system and the beam interruptions caused by the mask placed in front of the color target.

Another disadvantage of most prior art systems for reproducing dot multiplex color television signals resides in the relatively low light efficiency permitted by the optical producing device. For example, regardless of whether a plurality of color tubes or a single color tube were being used to reproduce the color television image, it has been the practice in the prior art to illuminate the face of the tube or tubes only during the intervals corresponding to sampling of the color channels at the transmitter. There was thus created in prior art systems, a considerable period of time, during the reproduction of a color image in which no light was being produced by the receivers. The average brightness of the resulting picture was then much lower than had the excitation to the color tube or tubes been continuous.

It is, therefore, an object of the present invention to provide an improved visual indicating system applicable to the reproduction of color television signals in such a way as to reduce the deleterious effects mentioned herein above.

In realizing the above improvements the present invention contemplates the use of a single color reproducing tube having a target thereon which is productive of a color which is dependent upon the position of the electron beam in striking the target. The intensity of the electron beam is then modulated directly with the incoming television video signal so as to produce brightness variations on the target of the single tube. Color variations by the tube are then obtained by detecting the timing or phase of the color signal with respect to a signal datum and controlling the position on the target which the beam strikes in accordance with this timing or phase comparison information.

The use of signal sampling or distribution at the receiver is then unnecessary with the result that the dot structure and "moiree" effect in the picture is reduced. Since the beam of the tube is not interrupted, the actual brightness of the picture is increased many times.

Furthermore, as will be seen hereinafter, the method of operation of the present invention eliminates the problem of providing coincidence of the different color components as produced on the screen.

In the carrying out of the present invention as described above, certain novel techniques and arrangements are encountered. For example, the present invention involves the use of heretofore unknown techniques of producing color changes in a single color tube in accordance with electrical signal information. These color producing techniques are in themselves based upon a further novel method and apparatus which permits the relative phase of two compared signals to be electrically indicated and made visibly determinable. These novel arrangements form a part of the present invention and their nature will become more apparent along with a better understanding of the present invention as set forth in the following description, especially when taken in consideration with the following drawings in which:

Figures 1, 2:
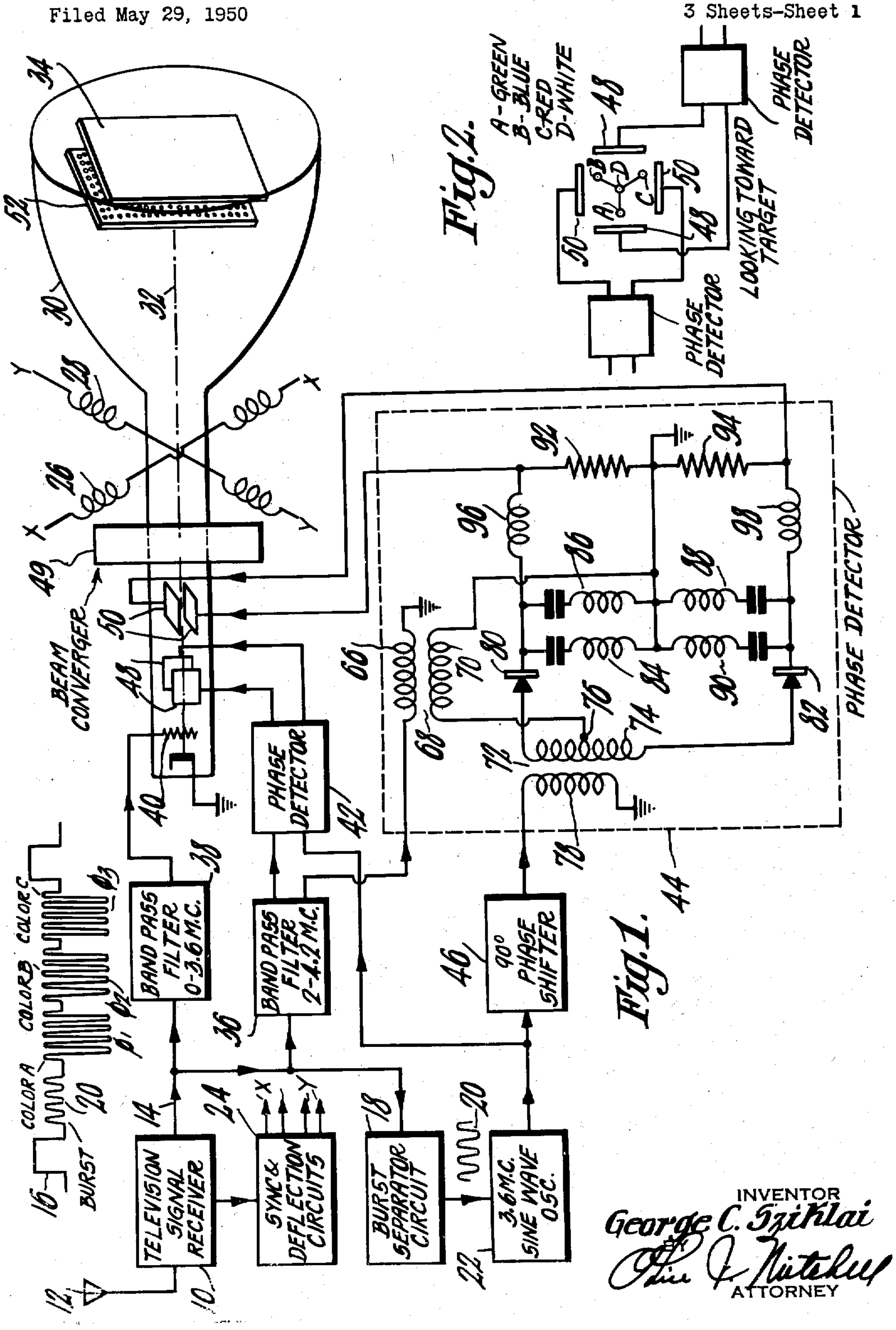
Figure 1 is a combination block diagram and schematic representation of one embodiment of the present invention as applied to a color television receiving system.
Figure 2 is a diagrammatic representation of certain features of the arrangement shown in Figure 1.

Turning now to Figure 1, there is indicated at 10 a typical television signal receiver. Signals picked up by the antenna 12 are fed to the receiver 10 and are amplified and demodulated thereby. The demodulated signals appearing at the output 14 of the receiver 10 appear substantially as shown at 16. By way of example only, this signal is illustrated as being of the dot multiplex color television type. The signal 16 is then applied to a burst separator circuit 18 which separates the burst 20 from the received signal 16. The burst 20 is then used to synchronize a sine wave oscillator 22 having a frequency by way of example, equal to the multiplex frequency of the dot color system e.g. according to present proposals in the art approximately 3.6 mc. Information derived from the received signal 16 by the television receiver 10 is also used to control the synchronization and deflection circuits 24 for the television receiver. The output of the deflection circuits are respectively applied to the deflection yokes 26 and 28 of the cathode ray tube 30. The electron beam 32 is thereby caused to produce a typical scanning raster on the phosphor screen 34 of the tube 30.

The arrangement thus far described in connection with Figure 1, except for burst separation and utilization, is conventional in every respect. Circuits for accomplishing the functions indicated, are shown and described in full detail in an article entitled "Television Receivers" by Antony Wright appearing in the March 1947 issue, of the RCA Review, pages 5 through 28. Detailed information as to the arrangement for burst separation are described in a recent pamphlet "Recent Developments in Color Synchronization in the RCA Color Television System" issued to the Federal Communications Commission in February 1950, by the Radio Corporation of America, RCA Laboratories Division. Another disclosure of the use of a burst type of color synchronizing system is in U.S. Patent No. 2,594,380, issued April 29, 1952, to L. E. Barton and P. H. Werenfels and titled "Synchronizing Apparatus for Color Signal Sampling Oscillators." Such a system generally forms the subject matter of a copending U.S. patent application of A. V. Bedford, Serial No. 143,800, filed February 11, 1950, and titled "Synchronizing Apparatus." The Bedford application issued December 27, 1955 as Patent 2,728,812.

According to the present invention, the demodulated color picture video signal 16 is also applied to a band pass filter 36 which passes only the upper frequency components of the signal, for example, 2 to 4.2 mcs. The signal 16 is also passed through a low pass filter 38 which passes all signals up to but not including the sampling frequency of the dot multiplex system. The output of this filter 38 is applied to the grid 40 of the cathode ray tube 30. In further accordance with the present invention the output of the band pass filter 36 is applied to the input of two separate signal comparing circuits 42 and 44. For the purpose of the embodiment shown in Figure 1 these signal comparing circuits have been indicated as phase detectors, but may take other forms. The two phase detector circuits 42 and 44 are identical in form and may be of the balanced modulator variety a species of which is shown for example in the dotted line area 44. The signal passed by the filter 36 is compared in phase and in amplitude by the phase detectors 42 and 44, with different phase displaced versions of the 3.6 mc. reference frequency developed by the oscillator 22. The reference signal applied to the phase detector 44 is by merit of the phase shifter 46, delayed 90 degrees with respect to the version of the same reference signal applied to the phase detector 42. The value of 90 degrees is of course only exemplary of a preferred value of phase shift and other values may of course be employed under other conditions. The outputs of the respective phase detectors 42 and 44 are respectively applied to horizontal and vertical deflecting means shown by way of example as electrostatic deflecting plates 48 and 50, respectively.

The arrangement of the target 34 and its associated mask 52 of the color tube 30, with the exception of the specific arrangement of the multicolor phosphor areas on the screen 34, is substantially as disclosed in the above mentioned RCA publication issued to the F.C.C. in April 1950, and entitled "General Description of Receivers for the RCA Color Television System Which Employ the RCA Direct-View Color Kinescopes." Such an arrangement is further described in greater detail in United States patent of A. C. Schroeder, No. 2,595,548 issued May 6, 1952. However, for ease in better understanding the present invention a detailed and magnified view of mask and target screen of the kinescope 30 in Figure 1 has been shown in Figure 4.

Figures 4, 5:
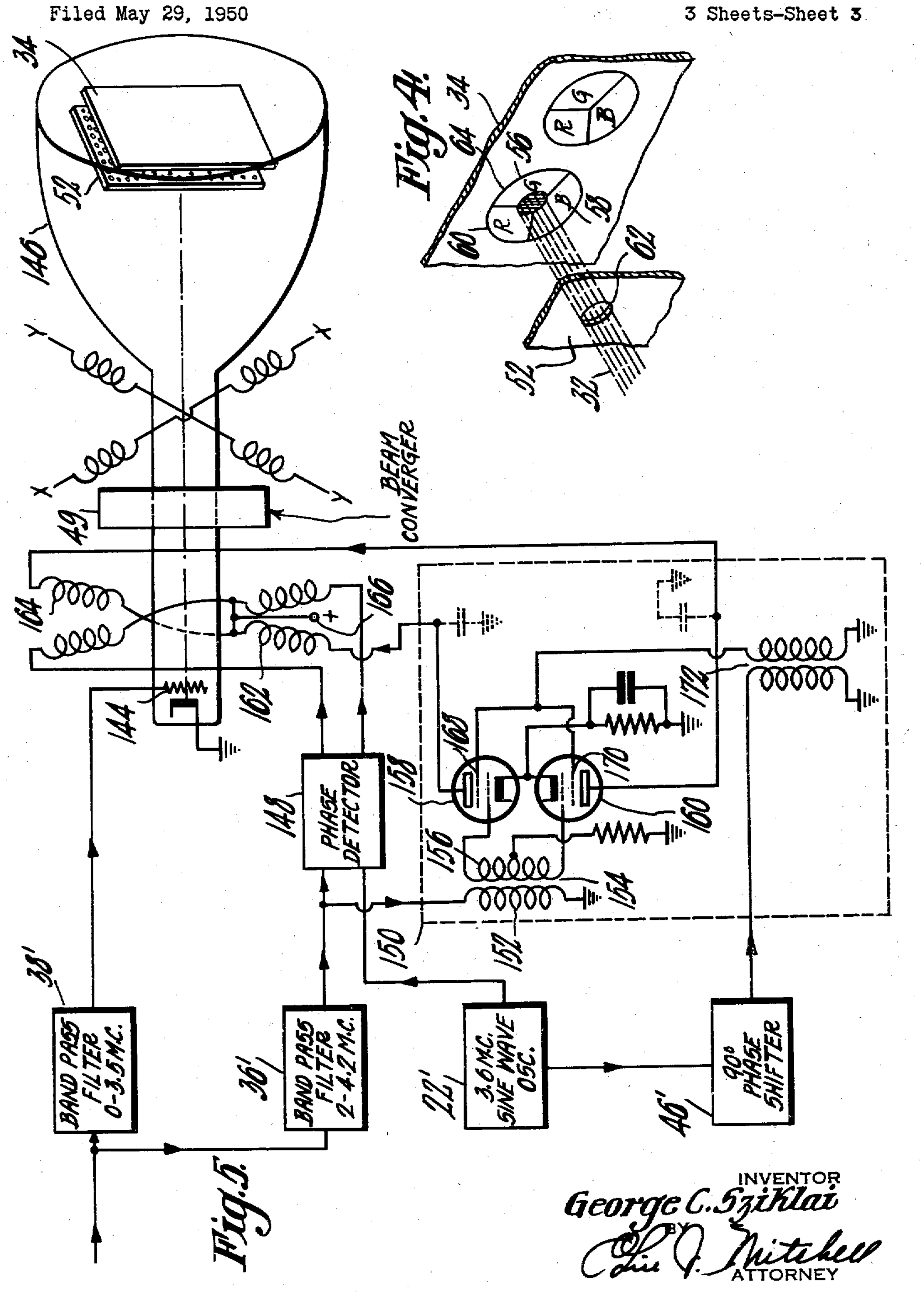
Figure 4 is a detailed showing of a section of the multicolor phosphor screen indicated in Figure 1.
Figure 5 is still another embodiment of the present invention as applied to a color television reproducing arrangement.

Here in Fig. 4 it is seen that the electron beam 32, in order to hit the screen 34 bearing multicolor phosphor dots 56, 58, and 60, must pass through the aperture 62 in the mask 52. The phosphor areas 56, 58 and 60 making up a single multicolor group 64 are so positioned relative to the aperture 62 that the electron beam 32 equally excites all of the phosphor 56, 58 and 60 when the beam 32 is substantially normal to the mask. In further accord with the present invention the areas 56, 58 and 60 are so spaced relative to each other and the dimensions of the electron beam 32, that the phosphor areas making up the group may be excited in various amounts all at the same time by changing the angle of the single beam 32 as it passes through the aperture 62. By way of example, the areas 56, 58 and 60 have been respectively represented as being productive of red, green and blue light. Thus, if the beam 32 is normal to the mask 52 resulting in equal excitation of the phosphor areas, the group 64 will emit white light. If the beam 32 enters the aperture 62 from an angle, with respect to the mask 52, the light emitted by the group 64 will no longer be pure white. As indicated in Figure 4 it will now have some net color value. In Figure 4 it is seen that the beam 32 is exciting the green and blue areas to a greater degree of excitation than the red area of the group 64. The result will be that there will be produced an average light having a greenish-blue color to it, partially diluted by red. Since red, green and blue light in equal proportions constitutes white light, the resulting light from the group 64 will be a green blue light not fully saturated but having a considerable amount of white light in it.

If now, in accordance with the present invention, the angle at which the electron beam 32 strikes the mask 52 and target 34 of the tube 30 can be precisely controlled, the color of light produced on the target 34 can be also precisely controlled. The present invention accomplishes this precision control by providing additional horizontal and vertical deflection means such as, for example, horizontal deflection plates 48 and 50. Reference to Figure 2 will illustrate how precision color control may be obtained by the use of these deflection plates. Its operation is as follows. As shown in Figure 2, if the electron beam is deflected to the left by the horizontal deflecting plates 48 and held in that position by a phased potential across the plates 48, the beam will be diverted or taken away from its path along the axis of the tube 30. A beam convergence device such as 49, is of course, provided to redirect the beam across the axis of the tube after deflection by the plates 48 and 50. This device may be merely of a permanent magnetic type or electromagnetic in nature. By way of example, one form of beam convergence device suitable for this purpose is shown and described in U.S. patent application Ser. No. 165,551 by Russell Law, entitled "Convergence Control Mechanisms for Electron Beams," filed June 1, 1950, now Patent No. 2,757,231 issued July 31, 1956. The result will be that the beam will no longer strike the mask 52 at a normal angle and will consequently, as further seen by reference to Figure 4, tend to enter into the green area of any given phosphor group. By way of example, only position A has been indicated in Figure 2 as being productive of a green light. Correspondingly, positions B and C will each represent blue and red light. It will also be realized that the further to the left the beam is drawn at position A, in Fig. 2, the further it will enter into the green phosphor on the target phosphor group 64, or any other similar phosphor group on the target. It follows, therefore, that the further the electron beam is diverted from the axis D of the tube in Figure 2 (corresponding to a white color) the greater the color saturation of any given color will be. That is to say, the greater will be its freedom from having in its make up at any one time, all of the colors red, green and blue, corresponding to white light.

It may thus be seen that with the arrangement of the present invention as shown in Figures 1, 2 and 4, the actual color reproduced by the tube 30 is rendered a function of the direction and extent of radial displacement of the beam about the axis D of the tube as indicated in Figure 2. Furthermore, the saturation of any particular color will be a function of the amplitude of radial deflection of the beam from the axis D of the tube as indicated in Figure 2.

This novel color indicating arrangement of the present invention leads to the provision of the further novel arrangement for causing the proper deflection of the beam at any given instant during the reception of a color signal so as to reproduce the required color. Such an arrangement, in accordance with the present invention, is provided by the previously described configuration of the phase detectors 42 and 44 having their outputs connected with the horizontal and vertical deflection plates 48 and 50.

As will be seen hereinafter, the electrostatic deflection of the beam 32 for color purposes may be accomplished electromagnetically. Thus the plates 48 and 50 may be replaced by deflection coils external to the tube.

The phase detectors 42 and 44 as brought out hereinabove may be of any conventient type which will detect the relative phase of the incoming color signal with respect to some fixed signal standard. Purely by way of example, the phase detector arrangement in the dotted line area 44 has been shown to be of the balanced modulator variety well known in the communications art. In the particular form of the invention shown in Figure 1 it is not only desirable that the phase detector indicate relative phase relations between the applied signals, but also indicate relative amplitude difference between such signals. It will be seen, therefore, that forms of phase detectors other than the balanced modulator variety may be used as for example, the conventional signal sampling circuit shown and described in the above referenced RCA Review for December 1949 in an article entitled "6 MC Compatible High Definition Color Television System." Therefore, for the purposes of this invention the phrase "balanced modulator type phase detectors" or the like, will be meant to include all types of signal multiplying circuits which provide an output corresponding to the difference of the two frequencies fed to the detector. In conventional modulators a carrier signal having an angular frequency $\Omega$ modulated by a signal having an angular frequency of $\omega$ has the form of $$(A+B\cos\Omega t)(C+D\cos\omega t)=AC+(BC\cos\Omega t)$$
$$+(AD\cos\omega t)+\left(\frac{BD}{2}\cos(\Omega-\omega)t\right)+\left(\frac{BD}{2}\cos(\Omega+\omega)t\right)$$

where A, B, C and D are constants. See page 532 Radio Engineer's Handbook by F. Terman. However, the signal comparing or phase detecting circuit to be used in the present invention will provide an output corresponding only to the fourth term of the right hand side and will suppress by means of balance and/or filters the remaining terms of the right hand side of the above equation.

In the particular arrangement of the phase detector 44 in Figure 1, the output of the band pass filter 36 is applied to the primary 66 of a band pass transformer 68. The transformer 68 is designed to have a substantial response to all frequencies passed by the band pass filter 36. The signal appearing across the secondary 70 of the band pass transformer is applied to the input of the typical balanced modulator type phase detector shown in the diagram. The phase detector includes another transformer 72 whose secondary 74 is center tapped at 76. The primary 78 of the transformer 72 is supplied with reference signal from the oscillator 22. Thus, there will be induced across the secondary 74 a voltage corresponding to the 90 degree version of the sine wave oscillations supplied by the phase shift network 46. The high frequency component of the incoming color signal will also be made to appear across the upper and lower sections of the winding 74 by merit of the path provided by diodes 80 and 82, in combination with the impedances 84, 86, 88 and 90. Each of these latter impedances has been shown as being of the series tuned circuit type but may take a variety of other forms. For the purpose of the present invention, it is desirable that these impedances appearing low in value to the high in value frequency components supplied by the transformer 68 while appear high to any low frequency components produced by the non-linear action of the balanced modulator. Reference to page 200 of the "Radio Engineer's Handbook" by Terman, 3rd edition, will indicate various other parametric configurations which will produce most any desirable impedance versus frequency characteristic. With impedance elements of the character described, the output of the balanced modulator, appearing across the load resistors 92 and 94, will represent substantially only the low frequency components produced by the balanced modulator action. Inductances 96 and 98 further act to restrict the passage to the circuit 92 and 94 of high freqency components.

Generally speaking, in the use of this particular form of balanced modulator circuit for the present invention, it is desirable that the reference voltage (appearing across the secondary 74 of transformer 72) be of such an amplitude that it is always higher than the incoming color signal as developed across the secondary 70 of the band pass transformer 68. For example, it will be appreciated that, if the amplitude of the reference signal across the secondary 74 is lower than the signal voltage developed across the secondary 70 of transformer 68, the output characteristics of the balanced modulator will be discontinuous with respect to an amplitude increase of either the color or reference signal.

The operation of that aspect of the present invention having to do with the phase detector per se, is substantially as follows. If both the sine wave oscillator reference signal and color signal are in phase with one another as applied to the phase detector, it is apparent that the two signals will in effect add across the upper section of the center-tapped secondary 74 while subtracting across the lower portion of the center tapped winding 74. If both signals were of the same amplitude this would mean that zero voltage would be applied to the diode 82 and twice the peak voltage of either signal would be applied across the diode 80. This would render the upper terminal of the resistor 92 negative with respect to the lower terminal of resistor 94. If the signals on the other hand are 180 degrees out of phase the reverse action would obtain and the lower terminal of resistor 94 will become negative with respect to the upper terminal of resistor 92. If the voltages are 90 degrees out of phase with one another then equal currents would be passed by each of the diodes 80 and 82 and the result will be a net voltage of zero across the load terminals of resistors 92 and 94. Inspection will show that the phase versus output voltage of the detector circuit is substantially sinusoidal in form and for small variations along the steep side of the sine wave characteristic, is virtually linear. The manner in which the voltage adds or subtracts across the sections of the center-tapped transformer winding 74 also provides that an increase in the amplitude of either signal will provide a substantially linear increase in the output voltage developed across the resistors 92 and 94, for any given phase relation. Thus, it is seen that for the output voltage across resistors 92 and 94 to linearly reflect both changes in amplitude and phase one of the input voltages to the detector system must be held substantially above even the highest amplitude excursion of the other.

We will now examine the electric phase information supplied by the two phase detectors to deflect the beam in accordance with Figure 2. First, consider the transmission of an all white picture. Under such conditions no 3.6 mc. color component will be transmitted since each of the green, red and blue color components will be equal in amplitude. The outputs of both phase detectors 42 and 44 will then be equal to zero (for a given white area) and the beam will then assume the position D in Figure 2 corresponding to the axis of the tube. As described, white light will be produced. If now the single color A (corresponding for example, to green) is now transmitted, the incoming signal applied to each of the phase detectors will be of phase $\phi_1$. The output of phase detector 42 will then be voltage representative of a phase difference equal to $\phi_1$, while the output voltage of phase detector 44 will be indicative of phase difference $\phi_1$ plus or minus 90 degrees. In accordance with Figure 2 this will mean that $\phi_1$ was of the same phase as of the burst or the 3.6 mc. oscillator 22. Under such conditions the output of the phase detector 44 would be zero allowing the beam to rest midway between the plates 50. The output of the phase detector 42 on the other hand would be maximum thereby causing the beam to deflect toward one of the plates 48. The greater the amplitude of the received color signal (color A $\phi_1$), the further the beam will be deflected toward one of the plates 48 and hence as described above, the greater the saturation of the reproduced color will be.

Figure 3:
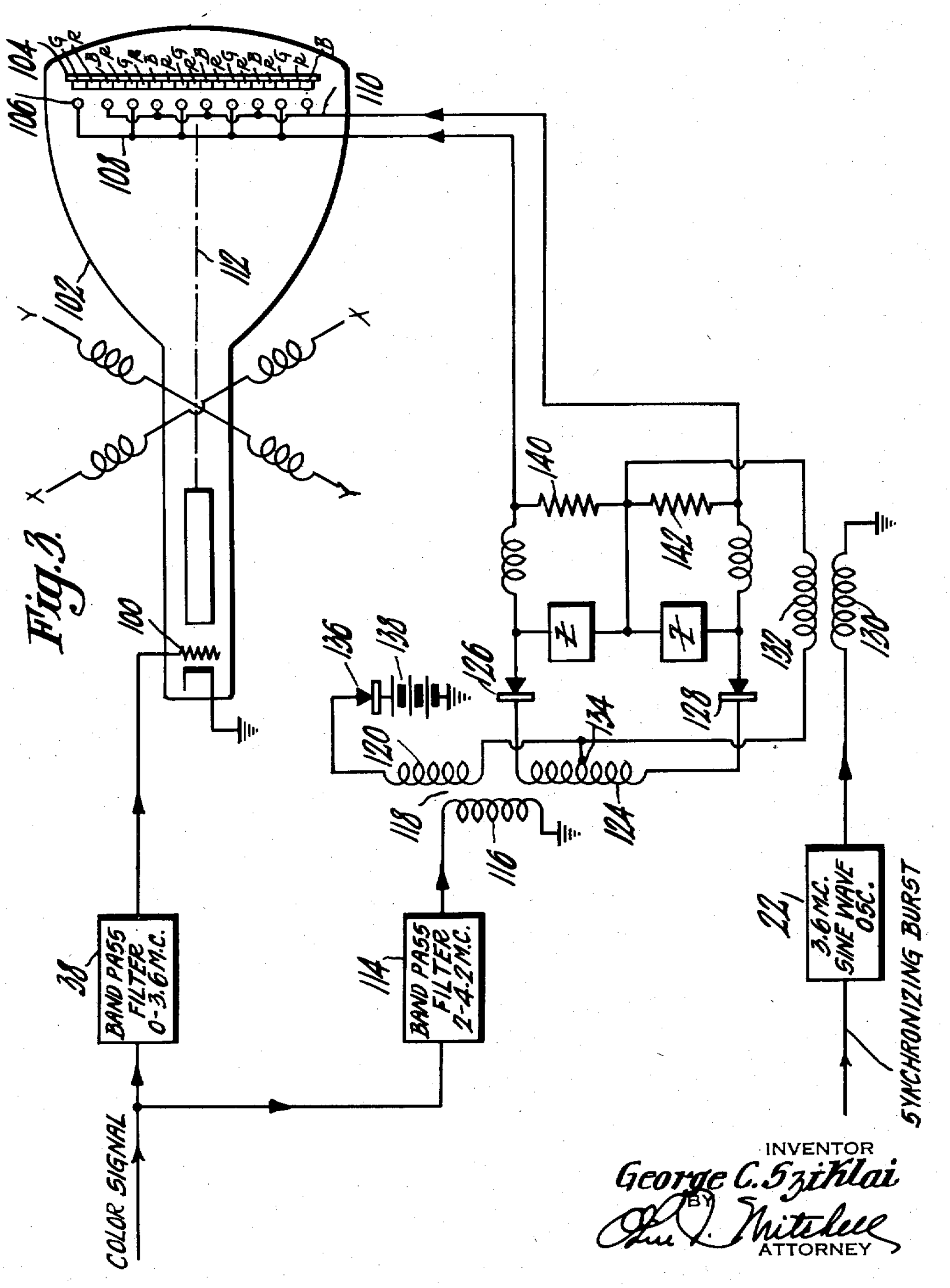
Figure 3 is another combination block diagram and schematic representation of a different embodiment of the present invention as applied to a color television receiving system.

Another embodiment of the present invention is shown in Figure 3. Again the incoming color signal 16 is applied to the input of the band pass filter 38. The output of the band pass filter 38 in this embodiment, however, is applied to the control grid 100 of a color television tube 102 of the type described in U.S. Patent 2,446,791 issued to A. C. Schroeder, Aug. 10, 1948. The target or screen of the tube 102 consists of a transparent body 104 such as the glass of the end of the evacuated tube envelope, or it may be a separate sheet of glass or mica inserted therein. Positioned in front of the screen is a grid comprising a plurality of wires 106, alternate ones of which are connected to conductors 110 and 108. These wires would be connected to the conductors at the sides of the screen, but in the diagrammatic illustration the connection has been shown between the wires and screen for convenience of illustration. On the base 104 is placed a plurality of color lines or sections extending from one side of the screen to the other. These color sections are the same size as the diameter of the wires, which is preferably the same size as the spacing between the wires. With this arrangement there is a color section or strip directly opposite each wire and each space. These color strips may consist of phosphor materials respectively capable of emitting different colored light. Alternatively, the phosphor material may produce white light and the colors of light varied by placing filters in front of the sections. The strips opposite the spaces between the wires are all adapted to produce the same color signal, red by way of example. The strips directly opposite the wires are alternately of different colors, say green and blue. The color arrangement, of course, may be made in any other order.

As described in the above referenced Schroeder patent, by placing equal highly positive potentials on both of the conductors 108 and 110 at the same time the electron beam 112 is made to strike the red phosphor as it passes between the conductors 106. If, however, the conductor 110 is made negative with respect to conductor 108, the electron beam will be attracted to strike the green phosphor sections of the tube. Contrariwise, if the conductor 108 is made negative with respect to the conductor 110 the electron beam will be deflected to strike the blue phosphor sections of the target 104. Finally, if both conductors 108 and 110 are made less positive together with respect to ground the electron beam in passing between the filaments 106 is defocussed so that it strikes the red, green and blue phosphors all at the same time, thereby causing some white light to be produced. The amount of white light produced determines the saturation of the produced color and depends upon the amount of beam defocussing which, in turn, depends upon the degree to which both conductors 108 and 110 are made less positive. It is to be understood that the grid 100 controls the total amount of the produced light and the conductors 106 control the hue and saturation of the produced light.

The embodiment of the present invention shown in Figure 3 provides a novel control arrangement for the Schroeder tube. This is accomplished by applying the incoming color signal to the input of a band pass filter such as 114 which passes only the upper frequency components of the signal. This has been shown by way of example for being 2–4 mc. The output of the band pass filter 114 is applied to the primary 116 of the band pass transformer 118. The band pass transformer 118 as used with the present invention is supplied with two secondary windings 120 and 124. A secondary winding 124 is connected with two diodes 126 and 128 in a typical balanced modulator phase detector fashion as shown for example, in the dotted lines area 44 of Figure 1. The reference voltage for the phase detector circuit is obtained from the 3.6 mc. oscillator 22 which is applied to the primary 130 of the transformer 132. The center-tap 134 of the secondary winding 124 is also connected with one end of the transformer secondary 120. The upper end of the secondary 120 is connected to another diode 136 and thence through a battery 138 to ground.

In the operation of Figure 3, the voltage developed across the load resistors 140 and 142 will represent the phase of the transmitted 3.6 mc. color signal relative to some datum. In the particular example of Fig. 3 this datum is the burst 20 (Figure 1). This will then cause a predetermined potential difference to appear across the conductors 108 and 110 and thereby cause an indication of color to be presented by the tube 102. As the phase of the incoming signal changes relative to the burst or other datum, thus representing a change in color, the color displayed by the tube will of course change. If, however, a pure white signal is transmitted, there will be no 3.6 mc. component in the transmitted signal so that some means must be provided for causing each of the electrodes 108 and 110 to become moderately positive with respect to ground. This is accomplished by the diode 136 in conjunction with the battery 138. During the reception of any color signal, and the transmission of a 3.6 mc. component the diode 136 rectifies this component and causes a current to pass through both of the resistors 140 and 142 thereby shifting the potentials of both conductors 108 and 110 in a more positive direction with respect to ground. The circuit is so proportioned that this shift in signal during reception of a color signal, is in excess of that provided by the battery 138 and is proportional to the amplitude of the 3.6 mc. component, thereby controlling saturation of the produced color. Now then, during the transmission of a white area, there will be no 3.6 mc. component induced in the winding 120 of the transformer 118. Immediately then rectification by the diode 136 will cease and the potential of the battery 138 will cause both of the electrodes 108 and 110 to become less positive with respect to ground. This, of course, defocusses the beam to a maximum degree and causes white to be reproduced on the target of the color tube.

A still further arrangement of the present invention is shown in Figure 5. The arrangement in Figure 5 is similar in nature to that shown in Figure 1 with the exception that some simplification has been achieved over Figure 1. Purely by way of example, the actual deflection of the beam in Figure 5 has been indicated as being deflected by electromagnetic means rather than by electrostatic means.

In Figure 5 as in Figure 1 the output of the band pass filter 38' is applied to the grid 144 of color reproducing tube 146. As before, the signal applied to the grid 144 controls the brightness of the image being reproduced. The output band pass filter 36' is accordingly applied to the input of the phase detectors 148 and 150 in a manner similar to that of Figure 1. Also, the output of the 3.6 mc. sine wave oscillator 22' is applied to the input of the phase detectors 148 and 150. In the case of the phase detector 150, the reference 3.6 mc. sine wave is given a 90 degree phase shift before application thereto. This is accomplished by the 90 degree phase shift network 46'. The phase detectors 148 and 150 of Figure 5 may be identical to each other, which is also the case in Figure 1. Here however each phase detector employs two amplifying tubes instead of diodes. The circuitry of the phase detectors 148 and 150 is shown by the schematic contained in the dotted line area 150. The output of the band pass filter 36' is seen to be applied to the primary 152 of a band pass transformer 154. The secondary 156 of the transformer is applied to the grids of discharge tubes 158 and 160. The anodes of the discharge tubes 158 and 160 are connected to opposite extremities of deflection coils 162 and 164. The inner extremities of these deflection coils are connected to a source of positive potential 166 for biasing of the discharge tube anodes. Reference signal is applied to the grids 168 and 170 of the discharge tubes 158 and 160 by means of the transformer 172. The inductances of the deflection yoke coils 162 and 164 are so chosen with respect to anode-cathode capacitances of tubes 158 and 160 and other incidental circuit capacitances (distributed capacity etc.) that the response of the output circuit has a high frequency cutoff in the neighborhood of 2 mc. This value may be more or less depending upon the desired operating conditions.

The operation of the circuit in Figure 5 is virtually identical to that described in detail with respect to Figure 1. The main advantage of the arrangement in Figure 5 over that of Figure 1 is that the phase detecting circuit itself is such as to lend amplification to the signals applied for deflection or positioning of the electron beam in the tube 146. Moreover, the phase detector arrangement of Figure 5 has obviated the use of the complex load impedances such as 84 through 90 of Figure 1. As described above, the high frequency cutoff of the phase detector in Figure 5 is accomplished through the proper selection of yoke inductance values.

From the foregoing, it will be seen that the present invention has provided a novel visual indicating system particularly suited for adaptation in color television reproducing systems. This indicating system has embraced first a novel means for visually indicating the phase of two electrical signals of the same frequency and secondly novel means for causing the indicated phase relation to produce visible changes in the color of the light produced by electron bombardment within a cathode ray tube. In order to achieve this, a novel electrical phase detecting circuit has been employed which develops an output voltage which is not only proportional to phase differences between applied signals but also indicative of amplitude differences between the applied signals. Finally, the technique of causing the indicated phase and amplitude changes in an applied signal to the phase detector, to produce color changes in a cathode ray tube is also based upon the above mentioned novel expedient of controlling the deflection of the beam in accordance with phase and amplitude information.

It will be appreciated that notwithstanding the fact that the present invention in each of its aspects has been disclosed with particular emphasis and application to color television systems that each aspect thereof may find valuable use in other branches of the electric art. For example, the arrangement of the present invention may be used to visually indicate any type of information regardless of its connection with a color television system. On the other hand, the novel phase detecting arrangement and indicating technique may find wide use in branches of the electrical art other than color television, It is to be further noted that as hereinbefore brought out, although the particular embodiments of the present invention with respect to color television have, purely by way of example, been illustrated as employing a particular type of color signal wave form and synchronization component, the utilization of the present invention is to be in no way construced as limited thereto.

What is claimed is:

1. In a color television apparatus including a cathode ray tube having a luminescent screen comprising a plurality of groups of phosphor areas respectively excitable to produce light of a plurality of component colors of an object when impinged by an electron beam approaching said screen at different angles, means including an electron gun for producing an electron beam and for directing it toward said screen, deflection means to cause said beam to scan a raster at said screen and auxiliary deflection means energizable to produce quadrature beam deflecting fields by which to control the angle of approach of said beam to said screen, the combination including: a source of a composite color television signal of the type having a datum component and a color information component, the phase of said color component relative to said datum component representing the color of said object; means for developing a reference signal synchronously related to said datum component; means including phase shifting apparatus coupled to said reference signal developing means to produce two quadrature phases of said reference signal; two phase comparators each having two inputs and one output; means for applying said color component to corresponding inputs of said respective phase comparators; means for applying said quadrature phases of said reference signal to the other corresponding inputs of said phase comparators so as to derive two color indicating signals from the respective outputs of said phase comparators; and means coupling the outputs of said phase comparators to said auxiliary deflection means for impressing said color indicating signals upon said auxiliary beam deflection means to control said quadrature deflecting fields respectively in accordance with said two color indicating signals.

2. In a color television system, the combination of, a color reproducing tube having a gun for scanning a cathode ray beam over a screen, a grid having parallel wires joined together, another grid having parallel wires joined together, the wires of one grid alternating with those of the other with uniform spacing between the wires, a screen in a plane parallel with and adjacent to said grids, a plurality of phosphor strips on said screen parallel to the wires of the grids, the strips opposite the spaces between the wires being adapted to produce light of one color, the strips opposite the wires of one grid being adapted to produce light of another color and the strips opposite the wires of the other grid adapted to produce light of a different color, a source of color television signal having a variable phase color indicating component, a source of a reference signal, means for comparing the phase of the color television signal color indicating component with said reference signal to develop a color representative output voltage, means for applying said output voltage to the grids of said cathode ray tube so as to shift the potentials of said grids relative to one another to effect color-selecting deflection of said beam, means responsive to the presence or absence of said received color television signal color indicating component for developing an indicating potential, and means for applying said indicating potential to the grids of said color reproducing tube so as to shift the potential of said grids in the same direction relative to a datum in response to the absence or presence of color television signal color component to effect either black and white or color image reproduction.

3. In a color television apparatus including a cathode ray tube having a luminescent screen comprising a plurality of groups of phosphor areas respectively excitable to produce light of a plurality of component colors of an object when impinged by an electron beam approaching said screen at different angles, means including an electron gun for producing an electron beam and for directing it toward said screen, deflection means to cause said beam to scan a raster at said screen, and auxiliary deflection means of a character and energizable to control the angle of approach of said beam to said screen, the combination including: a source of a composite color television signal of the type having a datum component and a color information component, the phase of said color component relative to said datum component representing the color of said object; means for developing at least one reference signal synchronously related to said datum component; phase comparator means having at least two inputs and one output; means for applying at least said one reference signal and said color component respectively to at least two of the inputs of said phase comparator means to derive color indicating signals from at least one output of said phase comparator means; and means for impressing said color indicating signals upon said auxiliary beam deflection means for energizing said auxiliary deflection means to control the angle of approach of said beam to said screen in accordance with the object colors represented by said color information component.

4. In a color television apparatus including a cathode ray tube having a luminescent screen comprising a plurality of groups of phosphor areas respectively excitable to produce light of a plurality of component colors of an object when impinged by an electron beam approaching said screen at different angles, means including an electron gun for producing an electron beam and for directing it toward said screen, deflection means to cause said beam to scan a raster at said screen, and auxiliary deflection means of a character and energizable to control the angle of approach of said beam to said screen, the combination including: a source of a composite color television signal extending over a given frequency band and having a datum component and a color information component, said color component having frequencies in the upper part of said given frequency bands and the phase of said color component relative to said datum component representing the color of said object; means for developing at least one reference signal synchronously related to said datum component; high-pass filter means having an input and an output; means for applying said composite signal to the input of said high-pass filter means; phase comparator means having at least two inputs and one output; means for applying at least said one reference signal and the output of said high-pass filter means respectively to at least two of the inputs of said phase comparator means to derive color indicating signals from at least one output of said phase comparator means; and means for impressing said color indicating signals upon said auxiliary beam deflection means for energizing said auxiliary deflection means to control the angle of approach of said beam to said screen in accordance with the object colors represented by said color information component.

5. In a color television apparatus including a cathode ray tube having a luminescent screen comprising a plurality of groups of phosphor areas respectively excitable to produce light of a plurality of component colors of an object when impinged by an electron beam approaching said screen at different angles, means including an electron gun for producing an electron beam and for directing it toward said screen, deflection means to cause said beam to scan a raster at said screen, and auxiliary deflection means of a character and energizable to control the angle of approach of said beam to said screen, the combination including: a source of a composite color television signal extending over a given frequency band and having a datum component and a color information component, said color component having frequencies in the upper part of said given frequency band, and the phase of said color component relative to said datum component representing the color of said object; means for developing a reference signal having at least one fixed timing relation with respect to said datum component; phase detector means having at least two inputs and one output, said phase detector means being of the type whose output is a function of both the phase difference and the amplitude difference of the signals applied to its inputs; a high-pass filter connected from said television signal source to at least one input of said phase detector means to prevent low frequency components of said television signal from reaching said phase detector means; means for applying said reference signal to at least one other input of said phase detector means to derive color indicating signals from at least one output of said phase detector means; and means for impressing said color indicating signals upon said auxiliary beam deflection means for energizing said auxiliary deflection means to control the angle of approach of said beam to said screen in accordance with the object colors represented by said color information component.

6. Apparatus according to claim 5 wherein said color image reproducing tube is of the type having a target comprising adjacent strips of light emitting phosphor and wherein each strip produces a light having a particular color value and wherein the means for defining the angle at which the beam strikes the target comprises a plurality of parallel conducting filaments adjacent said target, alternate filaments being connected to one of two input terminals to said image reproducing tube and wherein said connections for applying the output of said phase detector to said angle defining means comprises a shunt connection of said phase detector output across said input terminals.

7. Apparatus according to claim 6 wherein there is additionally provided means responsive to said color television signal derived from said high pass filter for concomitantly elevating the potential of the two angle defining input terminals of said color tube in accordance with the amplitude of the signal applied to said phase detector means.

8. In a color television system employing a color reproducing cathode ray tube having an electron beam adapted for excitation of a target of a kind in which light is produced in a color dependent upon the angle at which the electron beam strikes the target, said tube including means for modulating the intensity of the electron beam and beam deflecting means of a kind to define the angle at which the beam strikes the target, the combination including: a source of a color television signal including a first component representing brightness information and a second component comprising a wave modulated in phase in accordance with color indicating information; a source of at least one phase reference signal; means for applying the first component of said color television signal to said cathode ray tube beam intensity modulating means; signal comparing means having at least two inputs coupled respectively to said color television signal source and to said reference signal source for accepting said color television and reference signals to be compared and an output for delivering a comparison information signal; and means for applying said comparison information signal to said electron beam deflecting means, whereby the color reproduced by said cathode ray tube is a function of the signal output of said signal comparing means.

9. Apparatus according to claim 8 wherein said signal comparing means is of the phase detecting variety such that its output is rendered a function of the difference in phase between the signals applied to its inputs.

10. Apparatus according to claim 9 wherein said phase detecting signal comparing means is so arranged that its output is also rendered a function of the amplitudes of the signals applied to its inputs.

11. In a color television image reproducing system, the combination including: a cathode ray tube having a luminescent screen comprising a plurality of groups of phosphor areas respectively excitable to produce light of a plurality of component colors of an object when impinged by an electron beam approaching said screen at different angles, the areas of a given group being so located relative to one another and to at least one of the dimensions of said impinging electron beam that said beam may be caused to excite at any one time any one or all of the areas of said given group, and means for producing an electron beam and for directing it toward said screen; deflection means to cause said beam to scan a raster at said screen; auxiliary deflection means of a character and energizable to control the angle of approach of said beam to said screen; a source of a composite color television signal of the type having a color information component comprising a phase modulated wave of a given nominal frequency and a datum component comprising a fixed phase reference wave of said nominal frequency, the phase of said color component relative to said datum component representing the color of said object; means for detecting the phase relationship of said color component to said datum component to produce corresponding color indicating signals; and means for impressing said color indicating signals upon said auxiliary beam deflection means for energizing said auxiliary deflection means to control the angle of approach of said beam to said screen in accordance with the object colors represented by said color information component.

12. In a television reproducing system including a cathode ray image reproducing tube having an electron gun and a target upon which the electron beam formed by said gun is incident, the combination of, means for focussing and defocussing said beam as it strikes the target surface, a source of television signal, means for developing a control voltage in accordance with the amplitude of said television signal, and means for applying said control voltage to said focussing and defocussing means whereby to render the focus of said cathode ray beam a function of the amplitude of said television signal.

13. Color television apparatus as defined in claim 5 wherein, said color image reproducing tube is of the type having a target comprising groups of adjacent areas of light-emitting phosphor, each area producing light having a particular color value, said means for defining the angle at which the beam strikes the target including two deflection elements for diverting said beam from a path normal to said target respectively in two coordinates and a convergence element for re-directing said beam toward said normal path, and the output of said phase detector means being applied to said two deflection elements.

14. In a color television receiver for a composite video signal including a first component representing the light intensity of an image to be reproduced and a second component comprising a wave modulated in phase by color representative signals, the combination including: image-reproducing means including a luminescent screen excitable to produce light, first control means for exciting said luminescent screen in varying degrees to control the total amount of light produced by said luminescent screen, and second control means for suitably varying the character of said luminescent screen excitation to control the color of said produced light; means for applying at least the first component of said composite signal to said total light control means; phase detecting means responsive to the second component of said composite signal to derive said color representative signals from said phase-modulated wave; and means for applying said derived color representative signals to said second control means.

15. In a color television receiver for a composite video signal divisible into low and high frequency components, said low frequency component including signals representing the light intensity of an image to be reproduced, and said high frequency component including a wave modulated in phase by color representative signals, the combination including: image-reproducing means including a luminescent screen excitable to emit light, first control means for variably exciting said luminescent screen to control the total amount of light produced by said luminescent screen, and second control means for suitably varying the character of said luminescent screen excitation to control the color of said produced light; means for applying the low frequency component of said composite signal to said first control means; high pass filter means to segregate said high frequency video signal component from said composite video signal; phase detecting means responsive to said segregated high frequency video signal component to derive said color representative signals from said phase-modulated wave; and means for applying said derived color representative signals to said second control means.

16. In a color television receiver for a composite video signal divisible into low and high frequency components, said low frequency component including signals representing the total light intensity of an image to be reproduced, and said high frequency component including a wave modulated in phase by color representative signals, the combination including: cathode ray tube image-reproducing means including a source of an electron beam and a luminescent screen capable of emitting light when impinged by an electron beam, first control means to direct said electron beam for impingement of said luminescent screen and to vary the intensity of said electron beam to control the total amount of light produced by said luminescent screen, and second control means for effecting a suitable impingement of said luminescent screen by said electron beam to control the color of said produced light; means for applying the low frequency component of said composite signal to said first control means; high pass filter means to segregate said high frequency video signal component from said composite video signal; phase detecting means responsive to said segregated high frequency video signal component to derive said color representative signals from said phase-modulated wave; and means for applying said derived color representative signals to said second control means.

17. In a color television receiver for a composite video signal including a first component modulated in amplitude to represent the light intensity of an image to be reproduced and a second component comprising a wave modulated in phase to represent the hue and in amplitude to represent the saturation of the colors of said image, the combination including: image-reproducing means including a luminescent screen adapted to produce light of a color dependent upon the manner in which it is excited, first control means for exciting said luminescent screen in varying degrees to control the total amount of light produced by said luminescent screen, and second control means for suitably varying the manner of said luminescent screen excitation to control the color of said produced light; means for applying the first component of said composite signal to said first control means; means responsive to the phase and amplitude modulations of said wave to derive the hue and saturation representative signals from said phase- and amplitude-modulated wave; and means for applying said derived hue and saturation representative signals to said second control means.

18. In a color television receiver for a composite video signal including a first component modulated in amplitude to represent the light intensity of an image to be reproduced and a second component comprising a wave modulated in phase to represent the hue and in amplitude to represent the saturation of the colors of said image, the combination including: image-reproducing means including a target screen adapted to produce light of a color dependent upon the angle at which it is impinged by an electron beam, first control means for producing an electron beam for impingement of said target screen and for varying the intensity of said electron beam to control the total amount of light produced by said target screen, and second control means for varying the angle of impingement of said target screen by said electron beam to control the color of said produced light; means for applying the first component of said composite signal to said first control means; means responsive to the phase and amplitude modulations of said wave to derive the hue and saturation representative signals respectively from said phase- and amplitude-modulated wave; and means for applying said derived hue and saturation representative signals to said second control means.

19. In a color television receiver for a composite video signal divisible into low and high frequency components, said low frequency component including signals representing the total light intensity of an image to be reproduced, and said high frequency component including a wave modulated in phase to represent the hue and in amplitude to represent the saturation of the colors of said image the combination including: cathode ray tube image-reproducing means including a luminescent screen adapted to produce light of a color dependent upon the angle at which it is impinged by an electron beam, first control means for producing an electron beam for impingement of said screen and for varying the intensity of said electron beam to control the total amount of light produced by said screen, and second control means for varying the angle of impingement of said screen by said variable intensity electron beam to control the color of said produced light; means for applying the low frequency of said composite signal to said total light control means; high pass filter means to segregate said high frequency video signal component from said composite video signal; means responsive to the phase and amplitude variations of said segregated high frequency video signal component to derive the hue and saturation representative signals respectively from said phase- and amplitude-modulated wave; and means for applying said derived hue and saturation representative signals to said second control means.

References Cited in the file of this patent

UNITED STATES PATENTS

| | | |
|---|---|---|
| 2,248,442 | Stocker | July 8, 1941 |
| 2,358,545 | Wendt | Sept. 19, 1944 |
| 2,377,326 | Crosby | June 5, 1945 |
| 2,423,229 | Crosby | July 1, 1947 |
| 2,429,216 | Bollman | Oct. 21, 1947 |
| 2,529,485 | Chew | Nov. 14, 1950 |
| 2,577,368 | Schultz et al. | Dec. 1, 1951 |
| 2,611,816 | Darke | Sept. 23, 1952 |
| 2,644,138 | Bond | June 30, 1953 |
| 2,696,571 | Law | Dec. 7, 1954 |

FOREIGN PATENTS

| | | |
|---|---|---|
| 866,065 | France | June 16, 1941 |

OTHER REFERENCES

RCA Review, vol. XIV, June 1953, #2, page 174. (Copy in Div. 16.)